(12) United States Patent
Reddy et al.

(10) Patent No.: US 8,743,566 B2
(45) Date of Patent: Jun. 3, 2014

(54) SYSTEM AND METHOD FOR INCREASING DC POWER SYSTEM EFFICIENCY WITHOUT REQUIRING A LARGE BATTERY RESERVE

(75) Inventors: Raghothama Reddy, Murphy, TX (US); Roy J. Davis, Rowlett, TX (US)

(73) Assignee: General Electric Company, Schenectady, NY (US)

( * ) Notice: Subject to any disclaimer, the term of this patent is extended or adjusted under 35 U.S.C. 154(b) by 104 days.

(21) Appl. No.: 13/358,829

(22) Filed: Jan. 26, 2012

(65) Prior Publication Data

US 2012/0195081 A1  Aug. 2, 2012

Related U.S. Application Data

(60) Provisional application No. 61/436,863, filed on Jan. 27, 2011.

(51) Int. Cl.
*H02M 3/335* (2006.01)
*H02M 7/217* (2006.01)

(52) U.S. Cl.
USPC .................................. 363/21.06; 363/127

(58) Field of Classification Search
USPC .............. 363/67, 89, 127, 56.02, 21.03, 98
See application file for complete search history.

(56) References Cited

U.S. PATENT DOCUMENTS

| | | | |
|---|---|---|---|
| 5,237,494 A | 8/1993 | Baader et al. | |
| 5,402,480 A * | 3/1995 | Hirahara | 379/253 |
| 6,198,176 B1 | 3/2001 | Gillette | |
| 6,400,043 B1 * | 6/2002 | Batson et al. | 307/66 |
| 7,193,872 B2 | 3/2007 | Siri et al. | |
| 7,324,361 B2 | 1/2008 | Siri | |
| 8,395,917 B2 | 3/2013 | Humphrey et al. | |
| 2006/0198173 A1 | 9/2006 | Rozman | |
| 2010/0188871 A1 * | 7/2010 | Kim et al. | 363/21.03 |
| 2013/0049471 A1 | 2/2013 | Oleynik et al. | |
| 2013/0076143 A1 | 3/2013 | Guo | |

* cited by examiner

*Primary Examiner* — Matthew Nguyen
*Assistant Examiner* — Trinh Dang
(74) *Attorney, Agent, or Firm* — General Electric Company

(57) ABSTRACT

A system for increasing parallel rectifier DC power system efficiency. In one embodiment, the system includes: (1) a controller configured to sense and classify a load magnitude change into groups including large load transients and moderate load transients and (2) at least one rectifier coupled to the controller and configured to transition from a stand-by mode to an active mode upon an occurrence of one of a large load transient and a moderate load transient.

20 Claims, 3 Drawing Sheets

SYSTEM AND METHOD FOR INCREASING DC POWER SYSTEM EFFICIENCY WITHOUT REQUIRING A LARGE BATTERY RESERVE

CROSS-REFERENCE TO RELATED APPLICATION

This application claims the benefit of U.S. Provisional Application Ser. No. 61/436,863, filed by Reddy, et al., on Jan. 27, 2011, entitled "Method to Optimize Efficiency of a DC Power System Without Large Battery Reserve," commonly assigned with this application and incorporated herein by reference.

TECHNICAL FIELD

This application is directed, in general, to DC power systems and, more specifically, to DC power systems having multiple rectifiers configured to operate in parallel.

BACKGROUND

The advent of digital controllers has spurred the development of parallel-rectifier DC power systems. Such a system can exhibit a superior overall operating efficiency, because it varies the number of rectifiers it uses based on the load it is powering. Each rectifier in the system is capable of being placed in one of three states (or modes): an active, or operational, state; a stand-by state; and an inactive, or shut-down, state. The controller places the rectifiers in the active, stand-by, and inactive states depending upon the desired operating rectifier capacity determined by design, end-user preference or overall system operating condition. The controller keeps the number of active rectifiers to a minimum configured capacity threshold, which causes them to operate at a higher deterministic current level and, consequently, at a higher operating efficiency. Losses in the rectifiers that are in the inactive or stand-by states are quite low, perhaps zero.

As the load increases and reaches configurable operating capacity thresholds, the controller transitions rectifiers from the inactive state to the stand-by state or transitions rectifiers from the stand-by state to the active state. To keep efficiency as high as possible, the controller waits until the system load actually requires more power before it increases the number of active rectifiers. Fortunately, a battery reserve is available to provide any additional power needed during the interval when the rectifiers are transitioning from the inactive or stand-by states to the active state.

SUMMARY

One aspect provides a system for increasing parallel rectifier DC power system efficiency. In one embodiment, the system includes: (1) a controller configured to sense and classify a load magnitude change into groups including large load transients and moderate load transients and (2) at least one rectifier coupled to the controller and configured to transition from a stand-by mode to an active mode upon an occurrence of one of a large load transient and a moderate load transient.

Another aspect provides a method of increasing parallel rectifier DC power system efficiency. In one embodiment, the method includes: (1) sensing and classifying a load magnitude change into groups including large load transients and moderate load transients and (2) transitioning at least one rectifier from a stand-by mode to an active mode upon an occurrence of one of a large load transient and a moderate load transient.

BRIEF DESCRIPTION

Reference is now made to the following descriptions taken in conjunction with the accompanying drawings, in which.

DETAILED DESCRIPTION

As stated above, the controller of a parallel-rectifier DC power system employs a battery reserve to provide any additional power needed during the interval when the rectifiers are transitioning from the inactive or stand-by states to the active state. Depending on the design of the system and the rectifiers, this powerup interval can last several seconds, perhaps even longer, and is usually not a problem for systems with a large battery reserve. However, a system having a small battery reserve, a battery reserve that has degraded to an unknown extent, or no battery reserve at all would become overloaded and cease normal operation.

Consequently, it is realized herein that a parallel-rectifier DC power system is required to have a battery reserve sufficient to cover anticipated powerup intervals so they can take advantage of the control technique described in the Background above to improve efficiency. A parallel-rectifier DC power system having a smaller battery reserve, a degraded battery reserve or no battery reserve whatsoever, is compelled to employ a more conservative, less efficient control technique.

Described herein are various embodiments of a system and method for improving DC power system efficiency without requiring a battery reserve that is sufficient to cover anticipated powerup intervals. More specifically, described herein are various embodiments of a system and method for allowing a DC power system with limited or no reserve battery capacity to place unneeded rectifiers in inactive or stand-by states and therefore increase overall plant efficiency.

The embodiments described herein may also be applied to parallel-rectifier DC power systems that have other forms of reserve energy that may not have the ability to accommodate sudden load magnitude changes, such as those in which a backup generator provides reserve energy. Certain embodiments described herein involve decreasing the length of the powerup interval by reducing soft-start delays that occur when rectifiers are transitioned from the stand-by state without triggering internal current limit alarms or circuitry. Certain other embodiments described herein involve improving the controller's response to changes in load. Still further embodiments described herein involve both decreasing the length of the powerup interval and improving the controller's response to changes in load.

Figure 1:
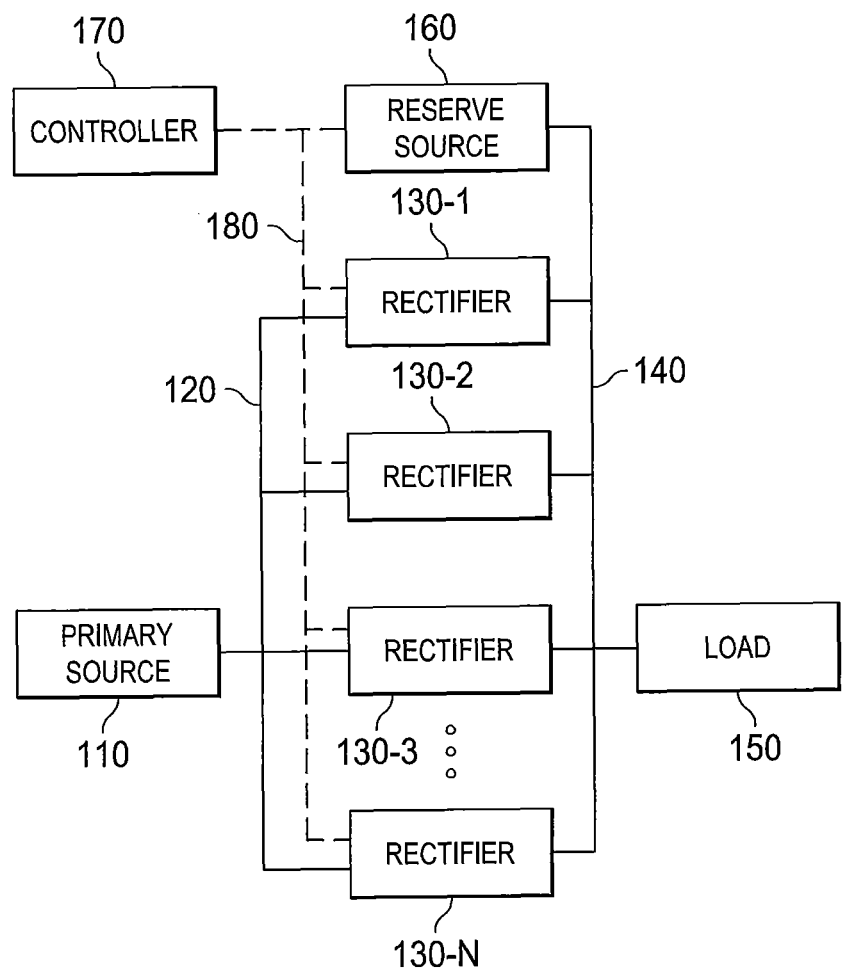
FIG. 1 is a high-level block diagram of one embodiment of a parallel-rectifier DC power system that includes a system for increasing DC power system efficiency.

FIG. 1 is a high-level block diagram of one embodiment of a parallel-rectifier DC power system. The system receives power from a primary source 110, such as the commercial power grid. An AC distribution system 120 distributes the power to multiple, parallel rectifiers 130-1, 130-2, 130-3, ..., 130-N. A DC distribution system 140 collects the output of the rectifiers 130-1, 130-2, 130-3, ..., 130-N, providing it to a load 150. A reserve source 160, such as a battery reserve, may or may not be part of the system. If present, the reserve source 160 may not be of sufficient power or duration, or may take too long to initiate, to cover anticipated powerup intervals. A central controller 170 is coupled to the rectifiers 130-1, 130-2, 130-3, ..., 130-N (and perhaps also to the reserve source 160) via a signal bus. Alternative embodiments distribute at least some of the functions of the central controller 170 among the rectifiers 130-1, 130-2, 130-3, ..., 130-N, reducing or eliminating the need for a central controller 170. In those embodiments, the common signal bus 180 couples the rectifiers 130-1, 130-2, 130-3, ..., 130-N together.

Figure 2:
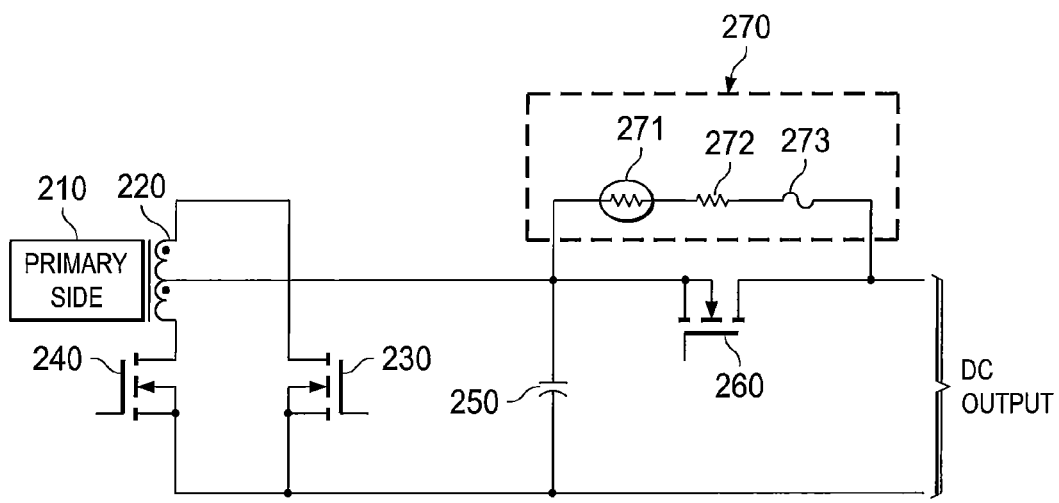
FIG. 2 is a partial schematic diagram of one embodiment of a rectifier in the parallel-rectifier DC power system of FIG. 1 having one embodiment of a pre-charge circuit.

FIG. 2 is a partial schematic diagram of one embodiment of one of the rectifiers 130-1, 130-2, 130-3, ..., 130-N of FIG. 1. The rectifier has a power train including a primary side 210, a transformer 220 and a secondary side. Though FIG. 2 does not show it, the primary side 210 has at least one primary-side power switch. In the embodiment of FIG. 2, the secondary side includes secondary-side power switches 230, 240, and an output capacitor 250. An ORing switch 260 functions to isolate the rectifier from the DC distribution system when in stand-by or inactive states.

When a rectifier is placed in the stand-by state, the ORing switch is made nonconducting (turned off), and the power train is turned off (typically by making at least some of its power switches nonconducting). The output capacitor 250 then discharges to essentially zero volts. The output capacitor 250 then needs to be charged back to the DC distribution system voltage before the rectifier can complete a transition to the active state. The need to recharge the output capacitor limits the rate at which a rectifier can be soft started when it is transitioned from the stand-by state to the active state.

Accordingly, a pre-charge circuit 270 may be employed to reduce rectifier soft-start delays by maintaining the output capacitor close to that of the DC distribution system voltage. The pre-charge circuit 270 embodiment of FIG. 2 includes a thermistor 271, a resistor 272 and a fuse 273. The resistor 272 is configured to provide pull-up voltage to the output capacitor 250. The thermistor 271 is configured to limit the rate at which current can flow through the pre-charge circuit 270, and the fuse 273 protects the pre-charge circuit 270 and the rectifier as a whole from harmful rates of current flow through the pre-charge circuit 270. Because the pre-charge circuit 270 maintains the output capacitor 250 at a voltage level close to the DC distribution system voltage, the soft start interval of the rectifier is substantially reduced when moving from the stand-by state to the active state.

Figure 3:
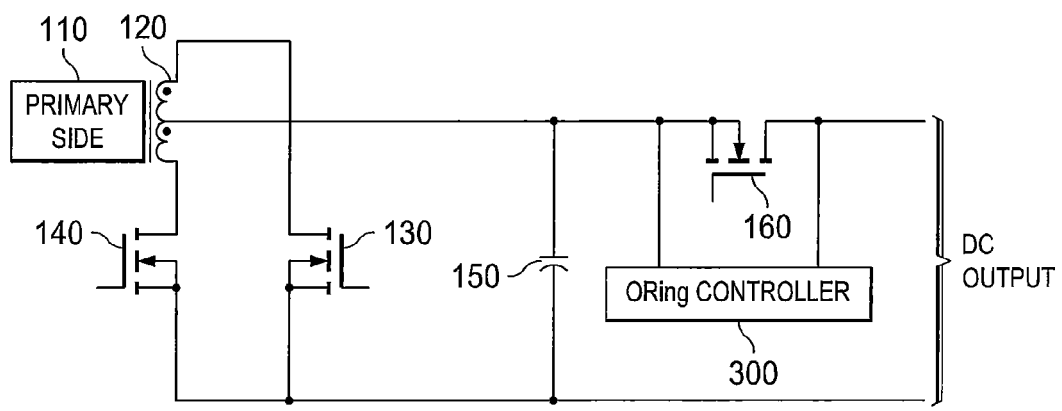
FIG. 3 is a partial schematic diagram of one embodiment of a rectifier in the parallel-rectifier DC power system of FIG. 1 having an alternative embodiment of a pre-charge circuit.

FIG. 3 is a partial schematic diagram of one embodiment of one of the rectifiers 130-1, 130-2, 130-3, ..., 130-N of FIG. 1 having an alternative embodiment of a pre-charge circuit that is integrated into an ORing controller 300. According to the embodiment of FIG. 3, the ORing controller 300 controls both the switching of the ORing switch 160 and a flow of current between the DC distribution system and the output capacitor 150 when the ORing switch 160 is open. The ORing controller 300 can use a modulated switch (not shown), for example, to pre-charge the output capacitor 150. In one embodiment, the modulated switch is pulse-width modulated.

As stated above, certain embodiments of the system and method are directed to improving the controller's response to changes in load. Accordingly, disclosed herein are embodiments of the system and method in which load magnitude changes are classified into groups. In one embodiment, load magnitude changes are classified by the rate of change over time. In another embodiment, load magnitude changes are classified by the change in load current. In yet another embodiment, load magnitude changes are classified by the amount of rectifier output current. In one embodiment, load magnitude changes are sensed by changes in DC distribution system voltage. In another embodiment, load magnitude changes are sensed by changes in rectifier output current. Those skilled in the pertinent art will readily understand that load magnitude changes may be classified and sensed in many different ways.

The embodiments that will now be described have three groups of classification, although embodiments having more or fewer groups of classification fall within the broad scope of the invention. The first group is designated "large load transients," or LLTs. The second group is designated "moderate load transients," or MLTs. The third group is designated "very slow load magnitude changes," or VSLCs. Voltage, current or other appropriate thresholds are selected that define what constitute LLTs, MLTs or VSLCs. As an example, a threshold between LLTs and MLTs may be a DC distribution system voltage drop of 1%. The predetermined voltage drop may be programmed the same for all the rectifiers in a system, or the rectifiers may have slightly different limits, for example 1%, 2%, 3%, etc. This may prevent all the reserve rectifiers from turning on at once, but rather in a staggered sequence. The thresholds may be preset by the manufacturer or user-programmable. Depending upon the type of load magnitude change, the controller (170 of FIG. 1) or the rectifiers (130-1, 130-2, 130-3, ..., 130-N of FIG. 1) initiate different measures to supply the increased load without having the DC distribution system voltage drop to levels that would precipitate a system malfunction or a loss of system operation, operate without sufficient current reserve, or trigger low DC distribution system voltage or internal current limit alarms.

An LLT is a transient sufficient to require at least one additional rectifier to be transitioned into an active state. When an LLT occurs, each rectifier in stand-by state is immediately transitioned to the active state. After the rectifiers are transitioned to the active state, the controller can recognize the changed state of the rectifiers and reconfigure the system as appropriate. Bringing each rectifier in stand-by state to the active state reduces delays resulting from controller polling and broadcast response times that would result were rectifiers to be brought to the active state one-at-a-time.

In embodiments that include the pre-charge circuit (e.g., of FIG. 2 or 3), this can be done quite quickly since the output capacitors of the rectifiers are pre-charged to substantially the DC distribution system voltage, substantially eliminating the delays required for the rectifiers to charge their output capacitors before they can supply load current.

In one embodiment, the controller is configured to store the time of the LLT. In another embodiment, the controller is configured to report the LLT. In yet another embodiment, the controller is configured to use LLT information gathered over time to determine if the LLT is predictable. In one embodiment, the controller is configured to anticipate a future LLT based on the information and reconfigure the system before its occurrence.

An MLT is a transient that, while insufficient to require at least one rectifier to be transitioned into an active state, nonetheless causes the rectifiers that are already in an active state to operate at, or close to, their current limit point. Without any intervention, an MLT or multiple MLTs would continue until the controller recognizes the added load and directs one or more rectifiers that are in the stand-by state to transition into the active state. For systems with little or no reserve battery capacity, this condition may be unacceptable even for the interval it would take the system controller to respond and for the one or more stand-by rectifiers to become active.

To prevent this condition, the rectifiers may be equipped with a common signal bus (180 of FIG. 1). In one embodiment, the common signal bus is a serial digital bus. In an alternative embodiment, the common signal bus is a simple high-low state bus. The following discussion will assume a high-low bus.

Under normal operating conditions, the controller may configure the system so that the load on an active rectifier is no greater than a predetermined percentage of its full load capability or its configured current limit setpoint. In one embodiment, this predetermined percentage may be preset by the manufacturer. In another embodiment, the predetermined percentage is programmable so that the user can adjust the limit on-site. As an example, the predetermined limit may be 50% of the rectifier capacity. When an MLT occurs, and the load on a given rectifier exceeds the predetermined limit, that rectifier or the controller changes the state of the common signal bus. The other rectifiers are configured to detect change of signal bus state, causing those in the stand-by state to transition to the active state. The change in signal bus state may be tempered with hysteresis to prevent noise or other conditions from causing the common signal bus to switch back and forth between high and low states in an undesirable fashion. In an alternative embodiment, the controller is configured to recognize the changed state of the common signal bus and reconfigure the system as appropriate.

In one embodiment, the controller is configured to store the time of the MLT. In another embodiment, the controller is configured to report the MLT. In yet another embodiment, the controller is configured to use MLT information gathered over time to determine if the MLT is predictable. In one embodiment, the controller is configured to anticipate a future MLT based on the information and reconfigure the system before its occurrence.

An VSLC is a change that comes about slowly enough so that the active rectifier or rectifiers can accommodate the additional needed output in the interval during which at least one additional rectifier is transitioned into an active state. For a VSLC, the controller is capable of sensing this condition as it occurs, and the system response time is adequate to supply the load without incident. Therefore no special intervention is necessary.

Figure 4:
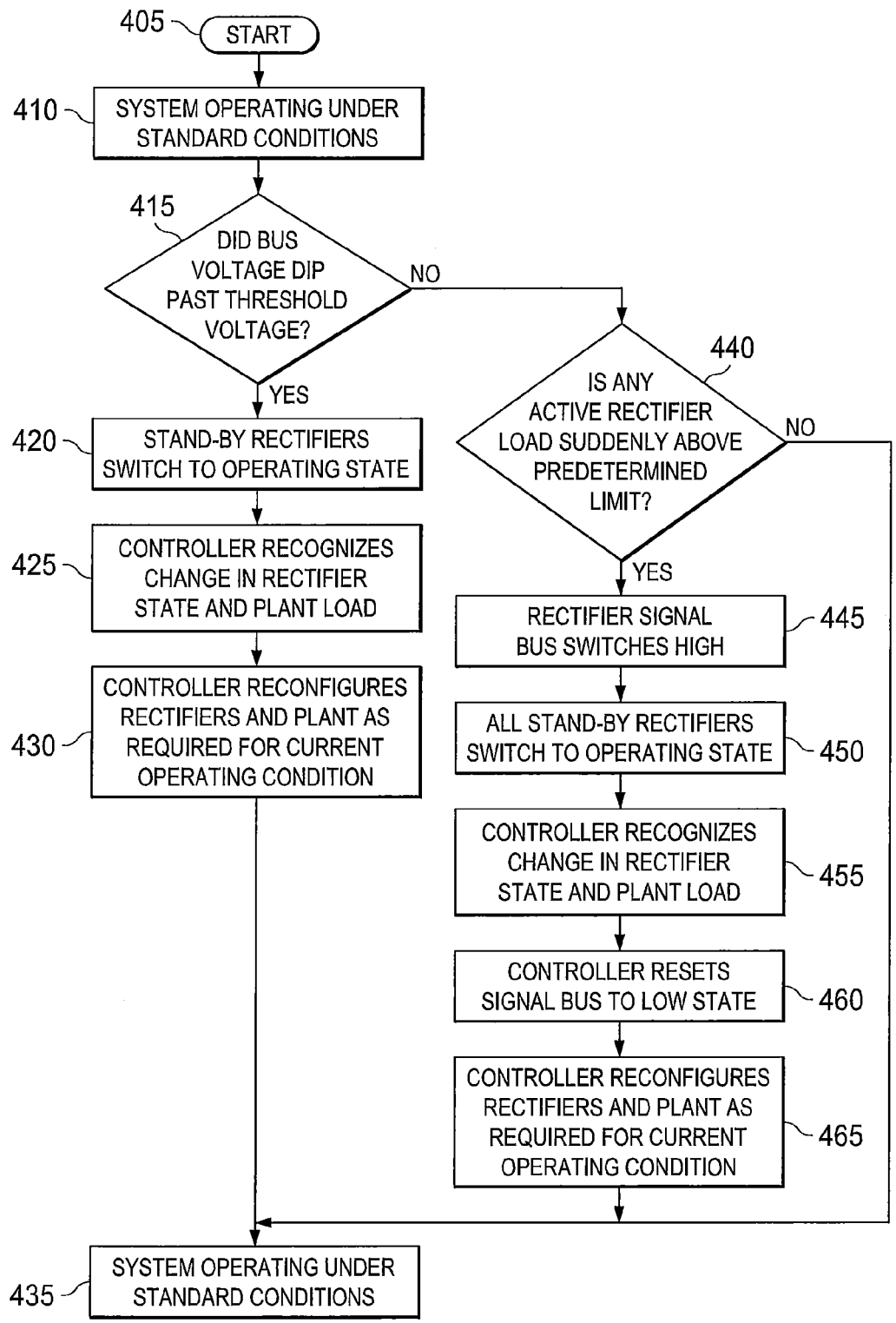
FIG. 4 is a flow diagram of one embodiment of a method for increasing DC power system efficiency.

FIG. 4 is a flow diagram of one embodiment of a method for increasing DC power system efficiency. The method begins in a start step 405. The DC power system operates in a normal or standard condition in a step 410. In the normal or standard condition, one or more rectifiers are in an active state, supplying the load, and one or more rectifiers are in a stand-by state, ready to transition to an active state if the load increases sufficiently. One or more rectifiers may be in an inactive state as well, ready to transition to the stand-by or active states as needed.

If an LLT occurs (as determined in a decisional step 415), the rectifiers that were operating in the stand-by state transition to the active state in a step 420, and immediately add to the capacity of the DC power system. In a step 425, the controller, in going through its normal operating routine, senses that the stand-by rectifiers are now active and also sense if the load has changed. In a step 430, the controller reconfigures the DC power system to accommodate the load as presently measured by the controller and, if possible, return one or more of the rectifiers to the stand-by state. The normal or standard condition is then re-entered in a step 435.

If an MLT occurs (as determined in a decisional step 440), the common signal bus responds in a step 445 by changing state. In a step 450, the rectifiers operating in the stand-by state sense the change in signal bus state, switching to the operating state and adding their capacity to the DC power system. In a step 455, the controller senses that the stand-by rectifiers are now active and that the DC power system is operating with all the rectifiers in the active state. The controller then senses if the load has changed. In a step 460, the controller resets the state of the common signal bus. In a step 465, the controller reconfigures the DC power system to accommodate the load as measured at that time by the controller. One or more of the rectifiers may be transitioned back to the stand-by state. The normal or standard condition is then re-entered in a step 435.

As stated above, the controller is capable of sensing a VSLC as it occurs, and the system response time is adequate to supply the load without incident. Therefore no intervention as described in FIG. 4 necessary.

Those skilled in the art to which this application relates will appreciate that other and further additions, deletions, substitutions and modifications may be made to the described embodiments.

What is claimed is:

1. A system for increasing parallel rectifier DC power system efficiency, comprising:
a controller configured to sense and classify a load magnitude change into groups including large load transients and moderate load transients, wherein said controller is configured to classify a load magnitude change below a predetermined threshold as a moderate load transient, and wherein said controller is configured to classify a load magnitude change above the predetermined threshold as a large load transient; and
a plurality of rectifiers coupled to said controller, wherein said controller is configured to transition at least one of the plurality of rectifiers from a stand-by mode to an active mode upon an occurrence of one of a large load transient and a moderate load transient.

2. The system as recited in claim 1 further comprising a common signal bus coupling at least one rectifier of the plurality of rectifiers to other rectifiers, said common signal bus changing state upon occurrences of said moderate load transients.

3. The system as recited in claim 1 wherein said at least one rectifier includes a pre-charge circuit configured to maintain an output capacitor of said at least one rectifier at a voltage close to a DC distribution system voltage.

4. The system as recited in claim 1 wherein said controller is a central controller, and wherein said at least one rectifier is operable in the stand-by mode, the active mode, and an inactive mode.

5. The system as recited in claim 1 wherein said groups further include a very slow load change.

6. The system as recited in claim 1 wherein all rectifiers in a stand-by mode are configured to transition from said stand-by mode to said active mode upon an occurrence of one of a large load transient and a moderate load transient.

7. The system as recited in claim 1 wherein said controller is configured to store a time of said load magnitude change.

8. The system as recited in claim 1 wherein said controller is configured to report said load magnitude change.

9. The system as recited in claim 1 wherein said controller is configured to use information regarding load magnitude changes over time to determine if said load magnitude changes are predictable.

10. The system as recited in claim 9 wherein said controller is configured to anticipate a future load magnitude change based on said information.

11. A method of increasing parallel rectifier DC power system efficiency, comprising:
   sensing and classifying a load magnitude change into groups including large load transients and moderate load transients, wherein a load magnitude change below a predetermined threshold is classified as a moderate load transient, and wherein a load magnitude change above the predetermined threshold is classified as a large load transient; and
   transitioning at least one rectifier of a plurality of rectifiers from a stand-by mode to an active mode upon an occurrence of one of a large load transient and a moderate load transient.

12. The method as recited in claim 11 further comprising a common signal bus coupling said at least one rectifier to other rectifiers, said common signal bus changing state upon occurrences of said moderate load transients.

13. The method as recited in claim 11 wherein said at least one rectifier includes a pre-charge circuit configured to maintain an output capacitor of said at least one rectifier at a voltage close to a DC distribution system voltage.

14. The method as recited in claim 11 wherein said controller is a central controller.

15. The method as recited in claim 11 wherein said groups further include a very slow load change.

16. The method as recited in claim 11 wherein all rectifiers in a stand-by mode are configured to transition from said stand-by mode to said active mode upon an occurrence of one of a large load transient and a moderate load transient.

17. The method as recited in claim 11 wherein said controller is configured to store a time of said load magnitude change.

18. The method as recited in claim 11 wherein said controller is configured to report said load magnitude change.

19. The method as recited in claim 11 wherein said controller is configured to use information regarding load magnitude changes over time to determine if said load magnitude changes are predictable.

20. The method as recited in claim 19 wherein said controller is configured to anticipate a future load magnitude change based on said information.

* * * * *